J. H. LEHMAN.

COMBINATION TIMER, DISTRIBUTER, AND INDUCTION COIL APPARATUS.

APPLICATION FILED FEB. 4, 1919.

Reissued May 13, 1919.

14,646.

2 SHEETS—SHEET 1.

INVENTOR

Joseph H. Lehman

BY

C. W. Fairbank

ATTORNEY

J. H. LEHMAN.

COMBINATION TIMER, DISTRIBUTER, AND INDUCTION COIL APPARATUS.

APPLICATION FILED FEB. 4, 1919.

Reissued May 13, 1919. 14,646.

2 SHEETS—SHEET 2.

INVENTOR

Joseph H. Lehman

BY

C. W. Fairbank

ATTORNEY

UNITED STATES PATENT OFFICE.

JOSEPH H. LEHMAN, OF HASBROUCK HEIGHTS, NEW JERSEY.

COMBINATION TIMER, DISTRIBUTER, AND INDUCTION-COIL APPARATUS.

14,646. Specification of Reissued Letters Patent. Reissued May 13, 1919.

Original No. 1,142,973, dated June 15, 1915, Serial No. 735,207, filed December 6, 1912. Application for reissue filed February 4, 1919. Serial No. 275,038.

*To all whom it may concern:*

Be it known that I, JOSEPH H. LEHMAN, a citizen of the United States, and a resident of Hasbrouck Heights, in the county of Bergen and State of New Jersey, (formerly residing in the borough of Manhattan, city, county, and State of New York,) have invented certain new and useful Improvements in Combination Timers, Distributers, and Induction-Coil Apparatus, of which the following is a specification.

My invention relates to improvements in electric spark producing apparatus, and is particularly adapted for use as a part of the ignition apparatus for internal combustion engines.

In my improved apparatus I employ an induction coil having normally stationary primary and secondary windings, and combine in the same casing therewith and as a part of the same apparatus, a timer for making and breaking the primary circuit of the primary coil and a distributer to deliver the current induced in the secondary coil to the several spark plugs, or other ignition apparatus. As one novel and important feature of my invention I make the inner or central part of the coil hollow and but slightly larger than a central shaft and mount on that shaft outside of or without the plane of the coil, the movable parts of the timer or interrupter and the distributer. As another important feature of my invention I preferably make this shaft of metal capable of being magnetized and utilize it as the core of the induction coil. As a further important feature of my invention I mount the condenser concentric with the induction coil, preferably outside of the secondary windings and within the main outer casing of the apparatus. As a further important feature I make the central shaft of a tube split or cut lengthwise to prevent eddy currents forming and containing soft iron wires to better adapt it to serve as the electro-magnetic core of the coil.

By means of my invention, the device is of comparatively small diameter and compact in form, and the electrical connections between the timer, distributer, coil and condenser are permanently made within the casing of the apparatus and not subject to derangement, grounding, loosening by vibration, or incorrect attachment by the workman making the installation after the complete apparatus leaves the factory.

Figure 1:
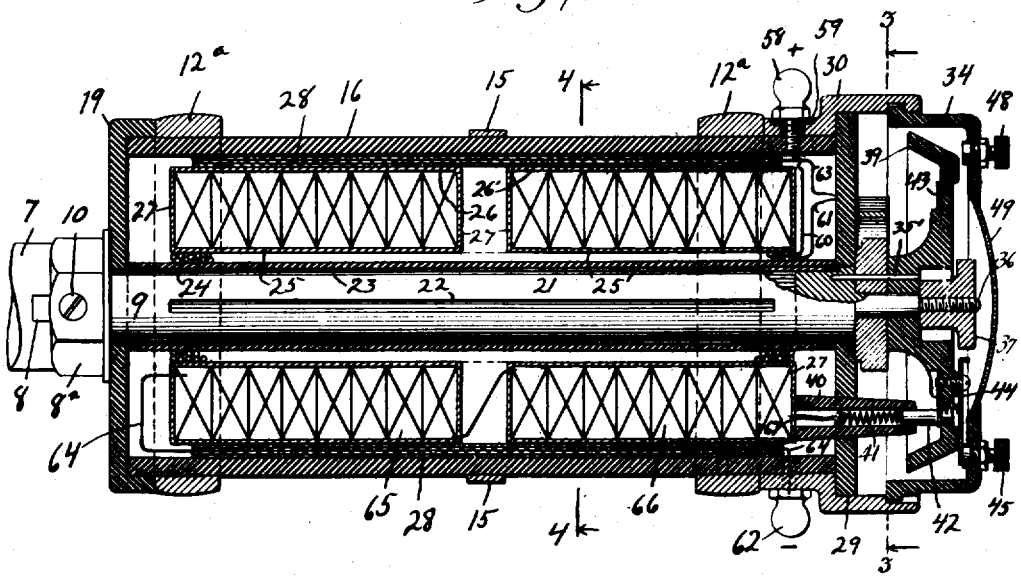
Figure 1 is a longitudinal cross section, with parts broken away, of one form of apparatus illustrating an application of my invention, the secondary coils being shown conventionally.
Figure 2:
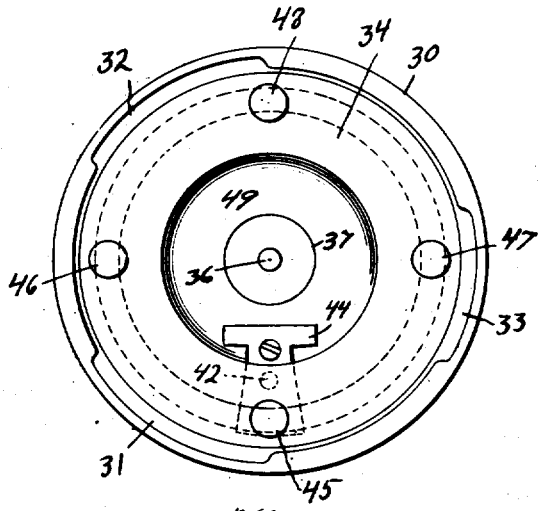
Fig. 2 is an end view thereof looking from the right-hand end of Figure 1, the clamping rings being omitted.
Figure 3:
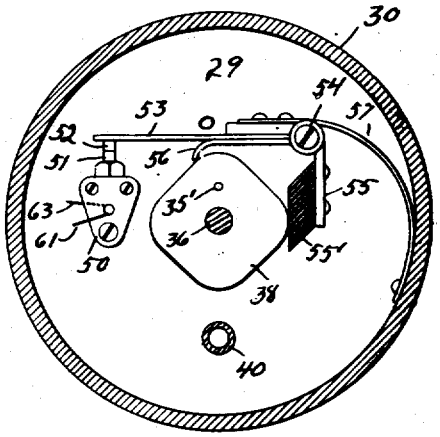
Fig. 3 is a section on the line 3—3 of Fig. 1, looking from right to left.
Figure 4:
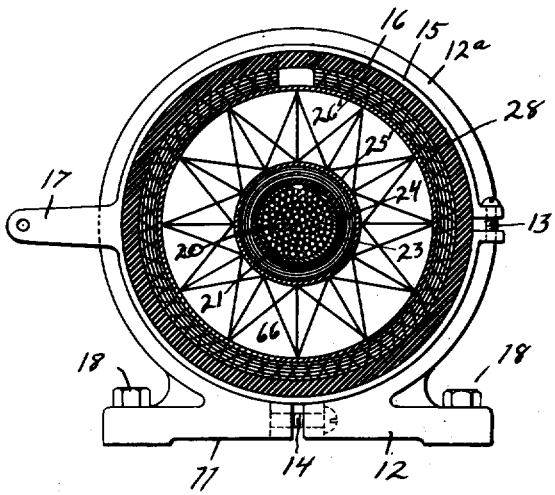
Fig. 4 is a section on the line 4—4 of Fig. 1, looking from right to left.
Figure 5:
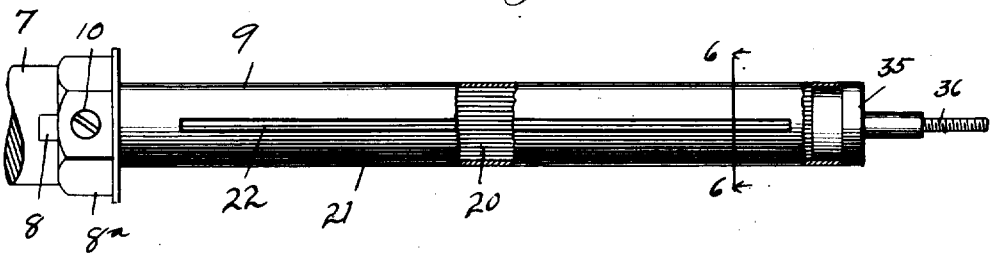
Fig. 5 is a longitudinal view partly broken away, illustrating the shaft extension or center of the apparatus, and, Fig. 6 is a cross section of the same on the line 6—6, looking from right to left.
Figure 6:
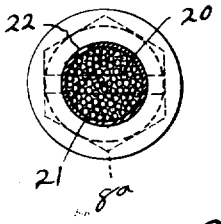

In the specific form illustrated in the drawings, the numeral 7 indicates a shaft adapted to be driven by the engine, which shaft may be slotted transversely to receive the key 8, which projects from the head of a nut $8^a$. This is secured to the shaft extension 9 which serves as a combination electro-magnetic core and timer and distributer shaft, by any suitable means, such as a screw 10. The key 8 being free to slide within the transverse cut at the end of the shaft allows for any necessary play when the engine driven shaft 7 and the shaft extension 9 of the apparatus are not in true alinement.

11 and 12 indicate the base or support of the apparatus, the upper portions of the same comprising rings $12^a$. The sections 11 and 12 may be drawn together to contract these rings by any suitable means, such as a screw 14. Two of these rings $12^a$ with their corresponding base portions 11 and 12 are preferably employed adjacent to the opposite ends of the apparatus. The apparatus may be suitably fastened down upon the frame of the engine or upon any other support by any suitable means, such as bolts 18

Intermediate of these rings, another ring 15 may be rigidly secured to the outer tube or casing 16 of the apparatus and this ring may be provided with a suitable projection 17, so as to facilitate the rotation of the apparatus within the bearings formed by the rings $12^a$. This ring 15 may have its ends drawn together so as to rigidly clamp the tube by means of a screw 13. By means of the projection 17 and the ring 15, the casing of the device may be rotated at will to advance or retard the spark as will be pointed out hereinafter.

The outer covering or casing of the apparatus preferably comprises a cylinder 16 of suitable insulating material, the rear end of which may be capped or closed by the head section 19 of suitable material which may be secured, in any preferred manner and which is provided with a central bore or bearing for the passage of the shaft extension 9. This shaft, in order that it may also serve as the electro-magnetic core of the induction coil, comprises a bunch of soft iron wires 20, secured in parallel arrangement within a suitable tube 21, which is preferably split or provided with a longitudinal cut such as 22, to prevent eddy currents.

Upon the outside of the metallic tube 21 is preferably mounted an insulating tube 23 of fiber or other suitable material but the shaft comprising the wires 20 and the tube 21 is free to rotate within this insulating tube. Upon the insulating tube 23 is preferably wound, the primary coil 24 of the induction coil. Upon the primary coil are secured insulating tubes 25—25′ upon which are secondary coils 65—66 and encircling these are insulating tubes 26—26′. I have shown two separate secondary coils arranged end to end with separate inner and outer insulating tubes 25—25′, 26—26′ but such sub-dividing of the secondary coils into sections is not an essential of my invention or construction. The ends of the secondary coils are shown as being closed by suitable rings or annular collars 27. Encircling the tubes 26—26′ is the condenser 28, which in turn is encircled by the outer sheath or covering 16. The primary and secondary coils and the condenser as well as the insulation tubes above referred to are all rigidly connected and carried by this outer sheath, covering, or shell 16.

The front end of the outer casing 16, that is, the end opposite to that through which the shaft enters, is closed by an insulating head, disk, or casing section 29 which is also provided with a central bore or opening through which the end of the shaft extension 9 projects and for which it acts as a bearing. The ring or annular member 30 is suitably secured to the cylinder 16 and encircles the disk 29 and is provided with a cylindrical flange projecting beyond this disk. A detachable cap 34 is provided, said cap having a peripheral flange adapted to be secured to the cylindrical flange of the ring 30. As a suitable securing means the ring 30 is shown as cutaway to form three recesses 31, 32, and 33 and the cap 34 has three projections adapted to enter these recesses so that the peripheral wall of the cap may be inserted within the flange of the ring 30 and be rotated therein to bring the projections out of registry with the recesses and retain the cap in position.

The tube 21 of the shaft has a plug or head 35 fitted into the end thereof and this plug or head is provided with an axially extending rod or projection 36 screw threaded to receive a nut 37. Secured on this rod is a cam member 38 for the timer or interrupter of the primary circuit and a brush carrier 39 for the distributer of the current from the secondary coil. These two members are secured on the rod by the nut 37 against the end of the tube 21 or the head 35 of the latter and are held against rotation in respect to the shaft by a suitable key, as for instance, the pin 35′.

The distributer of the secondary or induced current includes a tube 40 of insulating material projecting from the face of the plate or disk 27 and within this tube is a contact brush 42 pressed endwise into operative position by a spring 41 within the tube. The spring itself may serve to carry the current from the secondary coil to the brush 42. The brush carrier 39 which is shown as being made of insulating material, has secured to the inner or under surface thereof, a collector ring 43 with which the brush 42 is always in engagement so that the collector ring will always be electrically connected to the secondary coil. Secured to the outer surface of the distributer brush carrier 39 is the distributer brush 44 which is preferably a resilient contacting member electrically connected to the collector ring 43 in any suitable manner, as for instance, by a securing screw.

The outer cap 34 has a series of contact points and corresponding binding posts adapted to be connected with the spark plugs of the engine. These are shown as four in number and designated as 45, 46, 47, and 48. The four contact points are in the path of the brush or resilient contacting member 44 on the rotatable brush carrier 39 so that as the latter rotates within the cap 34, the secondary current is distributed to the several binding posts in succession.

The timer or interrupter of the primary circuit includes a suitable terminal, such as 50, secured to the insulating head 29 and provided with a contact point 51 adapted to contact with a point 52 carried by a resilient arm 53 mounted on a pivot 54. The arm is provided with an extension 55 having an insulated bearing face member 55′ adapted to engage with the extended portions of the face of the cam member 38. A resilient member 57 normally tends to keep the contact points 51, 52 apart and the circuit broken but as the cam 38 rotates, its engagement with the projecting member 55, 55′ swings the arm 53 and intermittently brings these contact points 51, 52 together to make the circuit. Should the resilient member 57 fail to separate the contact points 51, 52, an auxiliary arm 56 will be engaged by the extended portions of the cam 38 at the opposite side of the pivot 54 from the contact face member 55′, and thereby separate the contact points although permitting them to be brought together again as soon as the member 55, 55′ is again acted upon by the cam.

The primary current enters the apparatus at a binding post 58 which is insulated from the cap retaining ring by suitable insulating material, such as 59. This binding post is suitably connected to the winding of the primary coil by connections 60 as shown. After leaving the primary coil, the current passes through the wire 61 to the terminal 50, thence through the make and break contact points 51, 52 of the timer or interrupter, the arm 53, spring 57 and ring 30, to the opposite binding post 62 and thence back to the other side of the battery or other source of current.

One side of the condenser 28 is connected to the terminal 50 by a conductor 63 and the other side of the condenser is connected to the binding post 62 by a wire 64 which latter may also serve to ground the one end of the secondary coil. Thus the condenser is connected across the break established by the separation of the contacts 51, 52. When these are closed, a current flows through the primary windings and a current is induced in the secondary windings. One end of this secondary current is grounded, as previously stated, by the wire 64 which terminates at the binding post 62, while the other end is connected to the brush 42 by a wire 67 and the spring 41. The induced current flows through the separate sections or windings 65, 66 of the secondary coil and through the brush 42, collector ring 43, and distributer brush 44 to the contacts and binding posts 45 to 48 inclusive, from which binding posts the current is distributed to the spark plugs within the cylinders and back to ground.

The distributer brush 44 is shown as being spaced but a short distance from the nut 37 which latter is grounded. The cap 34 has a central window or glass 49 through which the nut and distributer brush are visible. Should the current to one of the spark plugs become broken or separated so that the spark plug is not in circuit, this fact will be readily indicated as the high tension secondary current instead of flowing to the terminal of the disconnected or inoperative spark plug will jump from the distributer brush across the gap to the nut 37. By noting this spark and the particular distributer contact or binding post which is in engagement with the distributer brush 44 at the instant of the spark, the particular spark plug which is out of commission may be readily determined.

The cam 38 has a definite and predetermined position in respect to the engine crank shaft but the timer or interrupter contacts 51, 52 are mounted on the casing of the apparatus. By rotating this casing, the spark may be advanced or retarded. It is to be understood that the screws 14 are not tightened so tight but what the casing may be rotated within the bearing rings 12ª but that the screw 13 is tightened so that the casing may be rotated by the movement of the arm or projection 17.

Of course it will be understood that various modifications may be made without departing from the spirit of the invention as claimed.

I claim as my invention:

1. The combination with the primary and secondary windings of an induction coil, of a shaft rotatably mounted therein and serving as the electro-magnetic core of the induction coil and a circuit making and breaking device for one of said windings and including a movable part adapted to be operated by the rotation of said shaft.

2. In an ignition mechanism, the combination with an induction coil, and a casing therefor, of an interrupter and a distributer within said casing, the stationary members of said interrupter and said distributer being secured to said casing and the movable members of said devices being rotatable without the plane of said coil, and a rotatable shaft within said coil for actuating the movable members of said interrupter and said distributer.

3. In an ignition mechanism, the combination with an induction coil having a tubular opening and a rotatable shaft extending therethrough and to a point beyond the end of said coil, of a distributer brush carried by said shaft beyond the end of the coil, an inclosing casing having a removable cover member provided with contact members for coacting with said distributer brush, and means for adjusting the angular position of said casing.

4. In an ignition mechanism, the combination with a rotatable shaft, an interrupter and a distributer operatively connected to said shaft, of an induction coil having a comparatively small axial passage through which said shaft extends and having a casing within which said interrupter and distributer are mounted outside of the coil, said casing being rotatable on said shaft to advance or retard the spark.

5. In combination with an induction coil having an electro-magnetic core movable independently of the coils thereof comprising soft iron wires within a metallic tube having a longitudinal cutaway portion, and a timer at one end of said coil having its rotatable member mounted upon said core.

6. In combination with an induction coil, a rotatable core therefor comprising soft iron wires within a metallic tube having a longitudinal cut away portion, and a timer at one end of said coil having its rotatable member mounted upon said core, said coil having a central longitudinal passage for said core.

7. In combination with a stationary induction coil, a rotatable core therefor comprising soft iron wires within a metallic tube having a longitudinal cut away portion, a timer at one end of said stationary coil having its rotatable member mounted upon said core, and a condenser concentrically mounted outside of the secondary windings of said coil.

8. In combination with an induction coil, a rotatable core therefor comprising soft iron wires within a metallic tube having a longitudinal cut away portion, a circuit breaker in the primary circuit of said coil having a resilient arm maintaining said circuit normally open and means in combination with said rotatable core for closing said circuit through said resilient arm.

9. In combination with a stationary induction coil, a rotatable core therefor comprising soft iron wires within a metallic tube having a longitudinal cut away portion, a circuit breaker in the primary circuit of said stationary coil having a resilient arm maintaining said circuit normally open, means in combination with said rotatable core for closing said circuit through said resilient arm, and means for causing said resilient arm to open said circuit when it fails to act by its own resiliency.

10. In combination with a stationary induction coil, a rotatable axially disposed central member therefor, a circuit breaker in the primary circuit of said stationary coil having a resilient arm maintaining said circuit normally open, means in combination with said rotatable member for closing said circuit through said resilient arm, and means for causing said resilient arm to open said circuit when it fails to act by its own resiliency.

11. In an ignition mechanism, an induction coil including primary and secondary windings, a metallic shaft extending therethrough and projecting beyond the end of the coil, a casing for said coil including a peripheral wall, an end wall at one end of the coil through which said shaft projects, and a removable cover spaced from and substantially parallel to said end wall, a timer for the primary coil, including a rotatable member carried by said shaft and a pair of relatively movable contacts beyond one end of said coil, and a distributer for the secondary coil, including an annular series of terminals on said cover, a rotatable member between said end wall and said cover, a brush carried by said member for distributing coöperation with said terminals, and means for connecting said brush and the secondary winding including a brush and a collector ring, one carried by said end wall and connected to said secondary coil and the other carried by said second mentioned rotatable member and connected to said first mentioned brush.

12. In an ignition mechanism, an induction coil including primary and secondary windings, a metallic shaft co-axial therewith, a casing having a section encircling said coil, a transverse disk through which said shaft projects and a removable cover spaced from and substantially parallel to said disk, a timer for the primary coil including a pair of relatively movable contacts carried by said disk and a rotatable member carried by said shaft adjacent to the outer side of said disk, a distributer for the secondary coil including an annular series of terminals on said cover, a rotatable member on said shaft between said first mentioned rotatable member and said cover, a brush carried by said second mentioned member for distributing coöperation with said terminals, a contact ring on the under side of said second mentioned rotatable member and connected to said brush, a brush guide projecting through said disk, and a brush therein connected to said secondary winding and engaging with said ring.

13. In an ignition mechanism, an induction coil including primary and secondary windings, a metallic shaft co-axial therewith, a casing having a section encircling said coil, a transverse disk through which said shaft projects and a removable cover spaced from and substantially parallel to said disk and a distributer for the secondary coil including an annular series of terminals on said cover, a rotatable member on said shaft between said disk and said cover, a brush carried by said rotatable member for distributing coöperation with said terminals, a contact ring on said rotatable member and connected to said brush, a second brush connected to said secondary winding and engaging with said contact ring, and means forming a safety spark gap between said first mentioned brush and said shaft.

JOSEPH H. LEHMAN.